May 3, 1932.  H. PERROT  1,856,424
BRAKE OPERATING MECHANISM
Original Filed Oct. 31, 1927
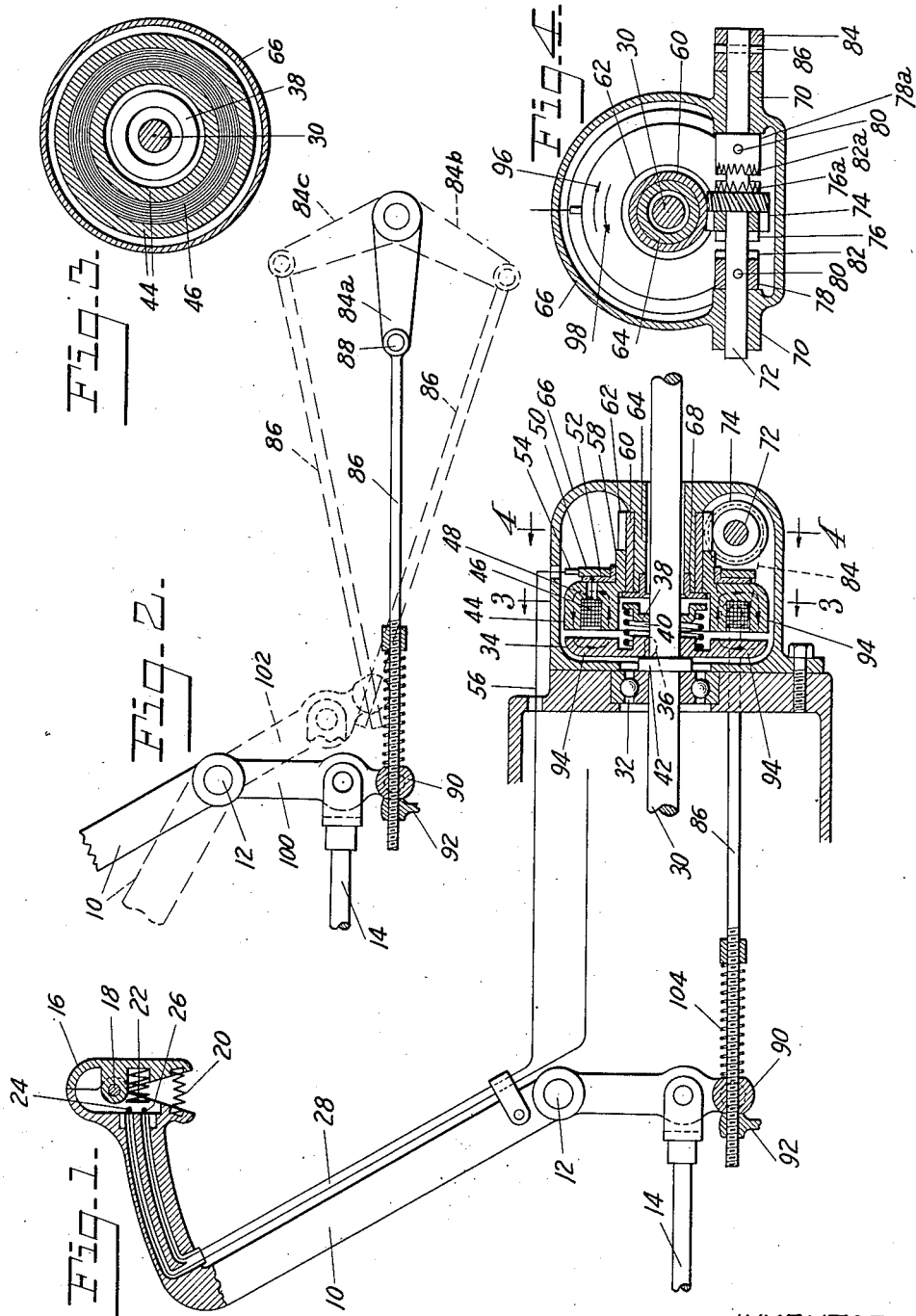
INVENTOR.
Henri Perrot.
Burton & McConkey
ATTORNEYS.

Patented May 3, 1932

1,856,424

UNITED STATES PATENT OFFICE

HENRI PERROT, OF PARIS, FRANCE, ASSIGNOR, BY MESNE ASSIGNMENTS, TO BENDIX AVIATION CORPORATION, OF NEW YORK, N. Y., A CORPORATION OF DELAWARE

BRAKE OPERATING MECHANISM

Original application filed October 31, 1927, Serial No. 230,091. Divided and this application filed November 19, 1928. Serial No. 320,266.

This invention relates to brake operating mechanism such as is employed on a motor vehicle, and includes the combination of an electrically controlled servo and manually operable brake applying connections. This application is a division of Serial Number 230,091, filed October 31, 1927.

An object is the provision of brake operating mechanism including a manually operable member, such as a brake pedal, to mechanically apply the brakes, and a servo which takes its power from a rotatably driven shaft and is adapted to be electrically controlled by a determined pressure applied to the manually operable member.

A meritorious feature resides in providing a servo which employs a clutch to couple the brake applying connections to a driven shaft to receive power therefrom to apply the brakes, which clutch is of the magnetic type and is responsive to a determined manual pressure applied to the manually operable brake control member.

In providing mechanism of this character I prefer to employ as a source of servo power a shaft so connected to a rotatable portion of the vehicle that it may be rotated thereby whether the vehicle is joined to or freed from its power source, one direction when the vehicle moves forwardly and the reverse direction when the vehicle moves backwardly, to the end that servo action may be had as long as the vehicle has momentum, said action being at the same time substantially proportional to the said momentum.

In conjunction with the driven shaft I provide an electrically controlled clutch operable to couple a brake applying connection to the said shaft to be actuated thereby in a certain direction irrespective of the direction of rotation of the said shaft, to the end that servo power to apply the brakes may be had whether the vehicle is moving forwardly or backwardly.

The electrically controlled clutch is of such a character and provided with control mechanism of such a type that it is brought into play by a determined pressure applied to a brake control member which also may be operated to mechanically apply the brakes, independently of the servo.

Other objects, advantages and meritorious features of my invention will more fully appear from the following description, appended claims and accompanying drawings, wherein—

Fig. 1 is a longitudinal vertical section through a device embodying my invention.

Fig. 2 shows operative positions of the device.

Fig. 3 is a transverse section taken at 3—3 of Fig. 1.

Fig. 4 is a transverse section taken at 4—4 of Fig. 1.

In the drawings a brake pedal 10 is pivotally supported at 12 and connected with a brake operating link 14 to actuate the link upon depression of the pedal. The pedal carries a tread plate 16 pivoted at 18 and held normally in the position shown in Fig. 1 by a spring 20.

If pressure is applied at the top of the plate by the foot of an operator the brake pedal is depressed in the usual manner to mechanically actuate the connection 14. If the pressure is applied at the bottom of the plate the plate will swing upon its pivot 18 and bring a yielding contact member 22 against terminals 24 and 26 of electric circuit 28 which circuit includes a suitable source of power such as a battery (not shown) and an electric coil adapted to energize and operate the magnetic clutch hereinafter described, to exert a servo power to apply the brake operating connection 14.

The shaft 30 which supplies the servo power is supported in bearing 32 and may extend from any rotating element of the vehicle, preferably from an element which rotates whenever the vehicle moves, whether it is actuated by the power plant, by gravity or from momentum gained by previous application of power.

A clutch plate 34 of mild steel or other magnetizable material surrounds shaft 30 and a key 36 fits tightly in shaft 30 and somewhat freely in plate 34, so that plate 34 is rotatably bound to shaft 30 yet may move axially thereon. A member 38 is secured to shaft 30 and a spring 40 has one end resting against this member and the other end against plate 34 to keep it against shoulder 42 of shaft 30.

The body 44 of the clutch has an annular groove into which a coil 46 is placed (see Figs. 1 and 3). One terminal 48 of this coil is joined to a metal ring 50 which is insulated from the clutch body 44 by insulating member 52. A suitable brush or other terminal 54 of wire 56 of circuit 28 thus conveys current to one terminal of coil 46 whether the body 44 of the clutch is revolving or is stationary. The other terminal of coil 46 is preferably grounded to body 44.

Clutch body 44 has a hub 58 which surrounds and is rigidly secured to the hub 60 of a helical gear 62. The gear 62 carrying clutch body 44 revolves freely on a hub 64 of housing 66 which surrounds the entire gear and clutch mechanism. A retaining member 68 extends into the end of hub 64 to hold body 44 and gear 62 against axial movement on the hub.

Supported in bearings 70 of housing 66 (see Figs. 1 and 4), a second shaft 72 is free to revolve, and a second helical gear 74, free to rotate on this shaft, meshes with gear 62 to be driven thereby. Driven gear 74, half of which is shown in full and half in section in Fig. 4 has end teeth 76 and 76a. Two collars 78 and 78a are secured to shaft 72 as by pins 80. These collars have teeth 82 and 82a at their inner ends which correspond to the teeth 76 and 76a of the gear, so that shaft 72 may be driven by shaft 30 whenever gear 74 moves axially in either direction sufficiently to mesh teeth at one end of the gear with those of one of the collars.

An arm 84 is secured to shaft 72 as by a pin 86. This arm is more clearly shown in Fig. 2 where 84a is its normal inoperative position and 84b and 84c its operative positions. A connecting rod 86 is joined by pin 88 to arm 84 and at its other end passes through a hub 90 at the lower end of pedal 10. A nut 92 serves as a means of adjustment to compensate for variation in the relative location of the pedal and the gear mechanism.

To operate the brake the driver depresses his pedal by foot pressure on the lower end of tread 16, causing spring 20 to yield, permitting contact 22 to electrically join the terminals 24 and 26, whereupon coil 46 is energized causing magnetic lines to flow in the direection of the arrows 94. The tendency of these lines to shorten draws plate 34 against the resistance of spring 40 until it is held with great force against clutch body 44, causing said clutch body to rotate in unison therewith. Gear 62 driven by the clutch body rotates gear 74. Now since the gears have helical teeth, gear 74 tends to move axially on shaft 72 whenever it is rotated.

Thus if gear 62 revolves in the direction of the arrow 96, end teeth 76 and 82 will be engaged, and arm 84 will be moved from 84a to 84b, while if gear 62 revolves in the direction of the arrow 98, end teeth 76a and 82a will be engaged and arm 84 will be moved from 84a to 84c. In either event the result is the same, namely that the pedal 10 moves from position 100 to 102, at which point the brakes are fully applied, and is kept at this point by the rotative drag between plate 34 and clutch body 44 as long as coil 46 is energized.

To release the brakes the operator lessens his foot pressure on tread 16 until connection 22 moves away from contacts 24 and 26, whereupon coil 46 is de-energized permitting spring 40 to separate plate 34 and clutch body 44.

Now if gear 74 were permanently secured against rotation on shaft 72 as by key, set screw, etc., the gears 74 and 62 and the clutch body 44 would have to revolve backwardly to permit arm 84 to return from a position 84b or 84c to the normal position 84a. This would be objectionable because of the time consumed, particularly where the gears are of great speed reducing ratio. But when gear end teeth as 76a are driving collar end teeth as 82a there is always a slight tendency for gear 74 to move axially away from collar 78a because of the angle at which the end teeth are cut. But the peripheral teeth of gear 74 are cut at such a helical angle as to produce an axial thrust opposite and greater than that of the end teeth as long as driving force is exerted on the peripheral teeth, so that as long as gear 74 is being driven its end teeth stay in mesh with the collar end teeth, and the instant it is no longer being driven a return to normal movement of arm 84 forces the end teeth apart thus permitting arm 84 to quickly return to its normal position. In effect then power effort fastens gear 74 to its shaft and the lack of power effort frees it.

Should the source of electrical energy fail, or should the operator choose to conserve it, he may apply his brakes by manual effort alone by applying his foot pressure to the upper end of tread 16, whereupon spring 104 will yield and connection 14 will be operated in the usual manner without movement of rod 86.

What I claim is:

1. Vehicle brake-applying mechanism comprising, in combination, a part rotating with the movement of the vehicle, a mechanical brake-applying device, a friction part having magnetic means for moving it into frictional dragging engagement with the rotating part and connected to operate the brake-applying device, an electric circuit for said magnetic means, and a driver-operated member having means controlling said circuit and which is also arranged to act directly on said brake-applying device.

2. Vehicle brake-applying mechanism comprising, in combination, a part rotating with the movement of the vehicle brakes, brake applying means, a friction part having magnetic means for moving it into frictional dragging engagement with the rotating part and connected to operate the brake-applying means, an electric circuit for said magnetic means, and a driver-operated member operatively connected to said brakes to manually apply the same having means for controlling said circuit simultaneously with said manual application.

3. Vehicle brake-applying mechanism comprising, in combination, a part rotating with the movement of the vehicle, brake-applying means, a friction part having magnetic means for moving it into frictional dragging engagement with the rotating part and connected to operate the brake-applying means, and a driver-operated member having means controlling said circuit and which is also arranged to act directly on said brake-applying means.

4. Vehicle brake-applying mechanism comprising, in combination, a part rotating with the movement of the vehicle, brake-applying means, a friction part having magnetic means for moving it into frictional dragging engagement with the rotating part, an electric circuit for said magnetic means, a driver-operated member having means controlling said circuit and which is also arranged to act directly on said brake-applying means, and an over-running connection from said friction part to the brake-applying means.

5. Vehicle brake-applying means comprising, in combination, a part rotatable during operation of the vehicle brake-operating means, electrically controlled means for coupling the rotatable part to said brake operating means, and a driver-operated member arranged to control the coupling means and apply the brakes simultaneously.

6. Vehicle brake-applying means comprising, in combination, a rotating shaft, an electrically-controlled magnetic clutch driven by said shaft, brake-operating means connected to said clutch to be operated thereby, and a driver-operated member arranged to control the clutch and also arranged to apply the brakes directly independently of said clutch.

7. Vehicle brake-applying means comprising, in combination, brake-actuating means, a service brake pedal, a driven shaft adjacent the pedal and provided with a rotating clutch member, another clutch member connected with the brake-actuating means and having magnetic means for bringing said clutch members into frictional engagement, and an electric circuit for said magnetic means having a controlling device responsive to a determined operating pressure applied to the service pedal said service brake pedal being adapted to operate the brake-actuating means and control said circuit simultaneously.

8. Vehicle brake-applying means comprising, in combination, brake-actuating means, a service brake pedal operably connected to said means, a driven shaft adjacent the pedal and provided with a rotating clutch member, another clutch member which is also connected with the brake-actuating means and which has magnetic means for bringing said clutch members into frictional engagement, and an electric circuit for said magnetic means having a controlling device responsive to a determined operating pressure applied to the service pedal.

9. Brake-applying mechanism for a vehicle having a power driven shaft comprising, in combination, brake-applying means, a brake pedal mechanically connected therewith to actuate the same, a servo including said shaft and an electrically operable device to couple the brake-applying means with the shaft for operation thereby, a circuit including said electrically operable device having a switch carried by the brake pedal.

10. Brake-applying mechanism for a vehicle having a power driven shaft comprising, in combination with the shaft, a brake-applying connection, a clutch member carried by the shaft and rotatable therewith, a cooperating clutch member coupled with the brake-applying connection, mechanism including an electric circuit having means operable to magnetically couple said clutch members together to cause said brake-applying connection to be actuated by the rotation thereof, said mechanism also including means for manually operating said brake applying connection simultaneously with the coupling operation.

11. Brake-applying mechanism for a vehicle having a reversibly rotatable power driven shaft comprising, in combination therewith, a brake-applying connection, a clutch member carried by the shaft to rotate therewith, a second clutch member adapted to be magnetically moved into dragging engagement with the first clutch member and connected with the brake-applying connection to actuate the same in a given direction upon an impulse of rotation from the power shaft through the clutch mechanism in either direction, and manual means for simultaneously actuating the brake-applying shaft and controlling the operation of said clutch.

12. Brake-applying mechanism for a vehicle having a reversibly rotatable power driven shaft comprising, in combination therewith, a brake-applying connection, a clutch having one part carried by the shaft to rotate therewith and a second part adapted to be moved into dragging engagement with the first part and connected with the brake-applying connection to actuate the same in a given direction upon an impulse of rotation transmitted from the power shaft through the clutch is either direction, an electric circuit including magnetic means operable to move said second clutch part into dragging engagement with the first clutch part to receive an impulse from the shaft and a control member coupled directly with the brake-applying connection to actuate the same and controlling the circuit to regulate the clutch to couple the brake-applying connection with the shaft to be acted upon by a power impulse therefrom.

13. Brake-applying mechanism for a vehicle having a rotatable element and comprising, in combination therewith, a brake-applying connection, a reversibly rotatable brake shaft connected therewith to apply said connection in a given direction upon a part turn rotation of the shaft in either direction, an electrically controlled clutch operable to couple said rotatable element with the brake shaft to rotate the brake shaft to actuate the brake applying connection.

14. Brake-applying mechanism for a vehicle having a reversibly rotatable power driven shaft, comprising, in combination therewith, a brake-applying connection, a brake shaft connected therewith to apply said connection in a given direction upon a part turn rotation of the shaft in either direction, an electrically controlled clutch operable to couple the power shaft with the brake shaft to rotate the brake shaft through a part turn upon rotation of the power shaft, a manually operable member controlling said clutch and directly connected with the brake-applying connection to actuate the same independently of the clutch.

15. Brake-operating mechanism for a vehicle comprising, in combination, a brake pedal provided with a pivotally supported tread plate, a brake-applying connection coupled directly with the pedal to be operatively actuated by the depression of the pedal, a servo having electric control means responsive to pressure applied to the tread plate, said servo coupled with the brake-applying connection to actuate the same.

16. Vehicle braking mechanism comprising, a shaft rotated by the movement of the vehicle, a manual brake operating member, an electromagnetic clutch on said shaft and linkage operable by engagement of said electromagnetic clutch to operate said manual member to apply the brakes.

17. Vehicle braking mechanism comprising, a relatively high speed shaft, a relatively low speed shaft adapted to operate brake applying linkage, speed reducing gearing between the two shafts but free to revolve on both, driver controlled means to connect the high speed shaft to the gearing, and means responsive to the power effort exerted on the low speed gear to connect said gear to the said low speed shaft.

18. Brake operating mechanism for a vehicle having brakes comprising, in combination, a brake pedal, means coupled with the pedal operable to apply the brakes in response to and in proportion to the exent of pedal movement, power means operable to exert brake applying effort on the brakes simultaneously with or independently of the pedal movement including an electric circuit and a control switch therein for said power means which switch is carried by the pedal.

19. Brake operating mechanism for a vehicle having brakes comprising, in combination, a brake pedal, means coupled with the pedal operable to apply the brakes in response to and in proportion to the extent of pedal movement, power means including a reversibly rotatable shaft rotating in one direction when the vehicle is moving forwardly and in the opposite direction when the vehicle is moving rearwardly, and mechanism responsive to rotation of the shaft in either direction to couple the shaft with the brakes to exert brake applying effort thereon, and electric control means for said mechanism including a circuit having a switch carried by the pedal and operable at any position of the pedal to render said power means effective or ineffective to apply the brakes.

20. Brake operating mechanism for a vehicle having brakes, a brake pedal coupled therewith to apply the brakes upon pedal movement, power means operable to apply the brakes including a reversibly rotatable shaft rotatable in one direction upon movement of the vehicle forwardly and in the opposite direction upon movement of the vehicle rearwardly and a rotatable axially movable member operable to couple the brakes with said shaft to receive brake applying effort therefrom in either direction of rotation of the shaft, said member movable axially in one direction to effect said coupling action when the shaft is rotating one way and movable axially in the opposite direction to effect said coupling action when the shaft is rotating in the opposite way, and an electric control for said power means carried by the pedal and effective at any position of the pedal to render said power means effective.

21. Brake operating mechanism for a vehicle having brakes, electrically controlled power means to apply the brakes including a driven reversibly rotatable shaft rotatable in one direction when the vehicle is traveling forwardly and in the opposite direction when the vehicle is traveling rearwardly and rotatable coupling means movable axially away from the shaft in either direction of rotation of the shaft to couple the shaft with the brakes to exert brake applying effort thereon, and an electric circuit having a switch operable to control the coupling of said driven shaft with the brakes.

22. Brake operating mechanism for a vehicle having brakes, a brake pedal mechanically coupled therewith to exert brake applying effort thereon, electrically controlled power means to apply the brakes including a driven reversibly rotatable shaft rotatable in one direction when the vehicle is traveling forwardly and in the opposite direction when the vehicle is traveling rearwardly, and rotatable coupling means movable endwise away from the shaft in either direction of rotation of the shaft to couple the shaft with the brakes to exert brake applying effort thereon, and an electric circuit having a switch carried by the pedal and operable to control the coupling of said driven shaft with the brakes.

23. Brake operating mechanism for a vehicle having brakes, electrically controlled power means to apply the brakes including a driven shaft reversibly rotatable upon reversal of direction of travel of the vehicle, a coupling member encircling the shaft adapted to permit independent rotation of the shaft, electrically controlled means operable to connect said coupling member with the shaft to be driven thereby, and rotatable connecting means automatically responsive to the rotation of said coupling member to couple the same with the brakes to exert brake applying effort thereon.

24. Brake operating mechanism for a vehicle having brakes, electrically controlled power means to apply the brakes including a driven shaft reversibly rotatable upon reversal of direction of travel of the vehicle, a coupling member encircling the shaft adapted to permit independent rotation of the shaft, electric control means operable to connect said coupling member with the shaft to be driven thereby, and rotatable connecting means automatically responsive to the rotation of said coupling member to shift axially outwardly therefrom on a line normal thereto to couple the same with the brakes to exert brake applying effort thereon.

In testimony whereof, I have hereunto signed my name.

HENRI PERROT.